Sept. 7, 1926.
R. E. GOOD
CLUTCH
Filed Dec. 15, 1921
1,599,046
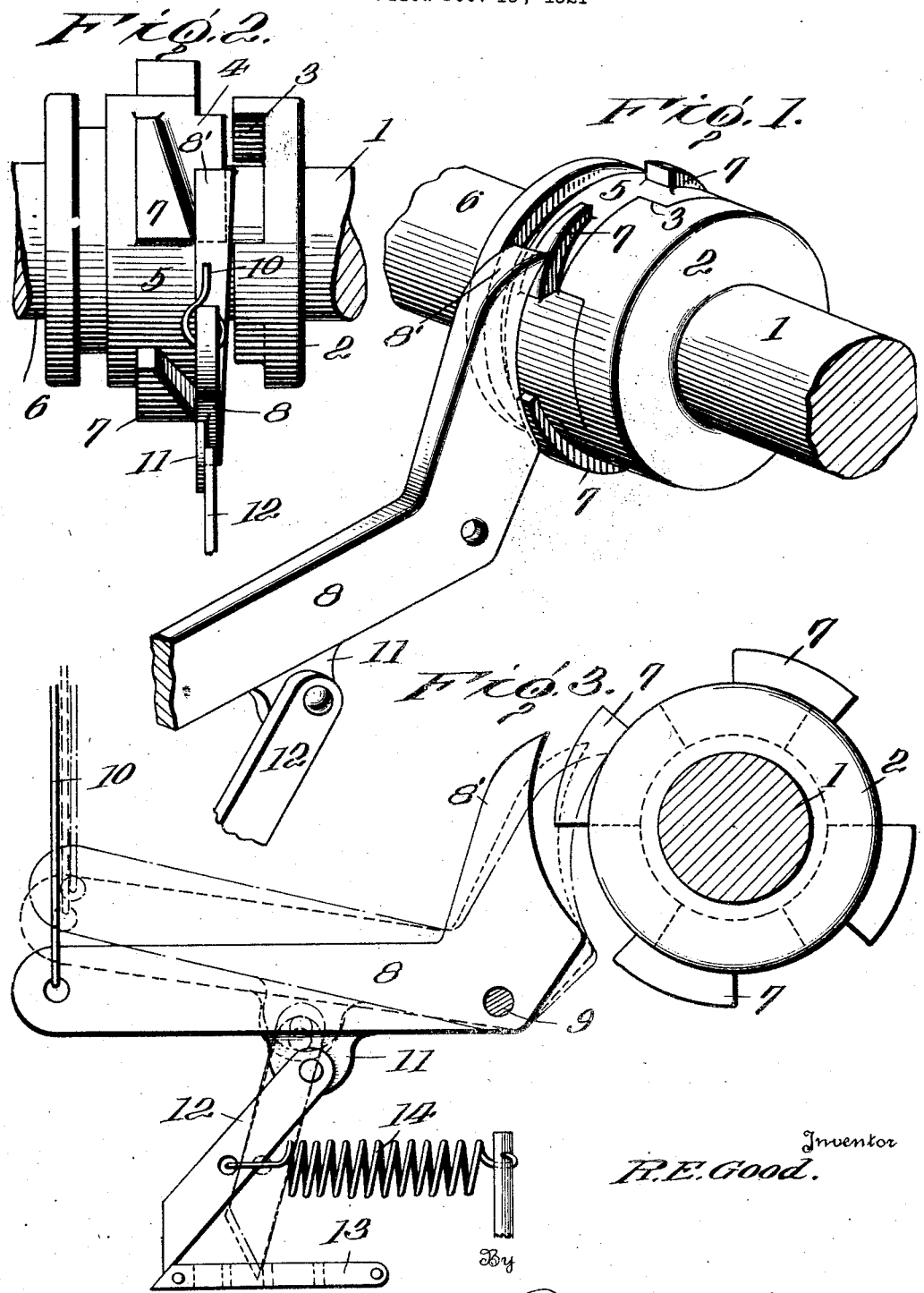
Inventor
R. E. Good.
By
Attorney Patented Sept. 7, 1926.

1,599,046

UNITED STATES PATENT OFFICE.

ROBERT E. GOOD, OF BERWICK, PENNSYLVANIA.

CLUTCH.

Application filed December 15, 1921. Serial No. 522,567.

This invention relates to certain new and useful improvements in clutches and is especially adapted to be used in connection with the construction of means for disconnecting a roll train from the driving means as disclosed in my application filed August 10, 1921, Serial Number 491,239, the object being to provide a clutch which can be instantaneously operated, one of the clutch members being provided with four spirals adapted to be engaged by a clutch operating lever which is provided with means for locking the same when moved into position to disconnect the clutch members.

Another and further object of the invention is to provide a clutch which is exceedingly simple and cheap in construction, the operating lever carrying a lazy boy having a spring for drawing it into engagement with a slotted plate so that as the operating lever is moved upwardly by the cable connected to the guides, the lazy boy will drop by gravity and be drawn by the spring into the notches so as to hold the clutch operating lever in engagement with the spirals of the clutch member.

In the drawings,

Figure 1 is a perspective view of my improved construction of clutch;

Figure 2 is a side elevation of the same; and

Figure 3 is an end elevation showing the means for holding the operating lever in engagement with the clutch.

In the drawing 1 indicates a driving shaft on which is secured a head 2 provided with a clutch face 3 which is adapted to engage the clutch face 4 of a head 5 secured to the driven shaft 6, the heads 2 and 5 forming a pair of cooperating clutch members which are adapted to be normally held into engagement by a suitable spring (not shown) and to be moved out of engagement so as to disconnect the driving shaft from the driven shaft.

The head 5 is feathered on the driven shaft 6 so as to move thereon so as to connect and disconnect the drive shaft from the driven shaft and is provided with four spirally arranged lugs 7 on its periphery adapted to be engaged by clutch operating lever 8 which is pivoted at 9 and so shaped that when moved into the position as shown in dotted lines in Figure 3 it will be instantaneously thrown in the path of one of the spiral lugs 7 so as to force the feathered head member 5 out of engagement with the head member 2 which is rigidly carried by the drive shaft.

The operating lever 8 is adapted to be connected to one or all of the guides of a roll train as shown in my above referred to application by cable 10 so that when the operating lever 8 is moved upwardly by the cable, the head 8' will be moved into the path of the spiral lugs so as to disengage the clutch faces of the heads.

In order to provide means for holding the operating lever in engagement with the spiral lugs or in the path of said lugs when moved into that position by the cable, I provide the lever with a lug 11 to which is pivotally connected a lazy boy 12 adapted to travel over a slotted guide 13 as clearly shown in Figure 3, a coil spring 14 being provided for pulling the lazy boy into the position shown in dotted lines in Figure 3 when the lever 8 is raised. The pointed end of the lazy boy rides over the slotted guide and drops into one of the slots so that the lever is held in raised position in order to hold the clutch faces of the clutch heads out of engagement with one another.

From the foregoing description it will be seen that I have provided a clutch which is provided with four spirals arranged on the movable clutch member and have mounted an operating lever in such a position in respect to said lugs so that when the operating lever is moved into engagement with the movable clutch member, it will be instantaneously engaged by one of the spiral lugs so as to draw the clutch faces out of engagement. It will also be seen that by the use of the lazy boy, the clutch operating lever is held in locked position when raised.

What I claim is:—

A clutch comprising a pair of cooperating clutch members, one of said clutch members being movably mounted in respect to the other, said movably mounted member being provided with a plurality of spiral lugs on its periphery, a pivoted lever arranged adjacent said clutch members and capable of being moved into the path of travel of said lugs, a lazy boy carried by said lever and a slotted guide over which said lazy boy is adapted to travel for locking said lever in engagement with said clutch member.

In testimony whereof I hereunto affix my signature.

ROBERT E. GOOD.